US012586737B2

(12) United States Patent
Mastenbrook et al.

(10) Patent No.: US 12,586,737 B2
(45) Date of Patent: Mar. 24, 2026

(54) SELF-PASSIVATING METAL CIRCUIT DEVICES FOR USE IN A SUBMERGED AMBIENT ENVIRONMENT

(71) Applicant: NORTHROP GRUMMAN SYSTEMS CORPORATION, Falls Church, VA (US)

(72) Inventors: Gary E. Mastenbrook, Ann Arbor, MI (US); James Richard Windgassen, Chester, MD (US); Patrick Anthony Green, Glenwood, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 185 days.

(21) Appl. No.: 18/513,980

(22) Filed: Nov. 20, 2023

(65) Prior Publication Data

US 2025/0166936 A1 May 22, 2025

(51) Int. Cl.
*H01H 1/02* (2006.01)
*H01H 1/58* (2006.01)
(Continued)

(52) U.S. Cl.
CPC ................ *H01H 1/02* (2013.01); *H01H 1/58* (2013.01); *H01H 37/32* (2013.01); *H01H 50/44* (2013.01);
(Continued)

(58) Field of Classification Search
CPC ............ H01H 1/02; H01H 1/58; H01H 37/32; H01H 50/44; H01H 71/40; H01H 2231/044
See application file for complete search history.

(56) References Cited

U.S. PATENT DOCUMENTS 2,149,853 A * 3/1939 Mccabe ................. H01H 37/32 337/377
2,744,979 A * 5/1956 Bank ...................... H01H 71/40 336/134

(Continued)

FOREIGN PATENT DOCUMENTS

CN 111863411 A 10/2020
CN 113007954 A 6/2021

(Continued)

OTHER PUBLICATIONS

TWOA: Office Action issued Jul. 22, 2025 for corresponding Taiwan application No. 113142353. Office Action + translation attached.

*Primary Examiner* — Thienvu V Tran
*Assistant Examiner* — Muaamar Qahtan Al-Taweel
(74) *Attorney, Agent, or Firm* — Tarolli, Sundheim, Covell & Tummino LLP

(57) ABSTRACT

One example includes a circuit device for use in a submerged ambient environment. The circuit device includes at least one input electrical contact configured to receive an electrical input. The circuit device also includes at least one output contact configured to provide an electrical output. The circuit device further includes at least one electrical conductor associated with an electrical function of the circuit device. Each of the at least one input electrical contact, the at least one output contact, and the at least one electrical conductor are formed at least in part from one of a variety of self-passivating metals. The at least one input electrical contact, the at least one output contact, and the at least one electrical conductor are exposed to the submerged ambient environment.

21 Claims, 5 Drawing Sheets

(51) Int. Cl.
*H01H 37/32* (2006.01)
*H01H 50/44* (2006.01)
*H01H 71/40* (2006.01)

(52) U.S. Cl.
CPC ....... *H01H 71/40* (2013.01); *H01H 2231/044* (2013.01)

(56) References Cited

U.S. PATENT DOCUMENTS

| | | | | | |
|---|---|---|---|---|---|
| 4,412,266 | A * | 10/1983 | Niino | H02H 7/085 361/76 |
| 4,933,520 | A * | 6/1990 | Ohba | H01H 1/02 200/266 |
| 8,231,927 | B2 * | 7/2012 | Nesbitt | B05D 3/12 427/276 |
| 2004/0169014 | A1 | 9/2004 | Pride et al. | |
| 2014/0254621 | A1 | 9/2014 | Lovens et al. | |
| 2018/0119302 | A1 | 5/2018 | Lim et al. | |
| 2018/0135850 | A1 | 5/2018 | Habib | |
| 2023/0365241 | A1 | 11/2023 | Hamilton et al. | |

FOREIGN PATENT DOCUMENTS

| | | | |
|---|---|---|---|
| JP | 2014514894 | A | 6/2014 |
| JP | 6635643 | B2 | 1/2020 |
| TW | 201740470 | | 11/2017 |
| WO | 2021173279 | A1 | 9/2021 |

* cited by examiner

SELF-PASSIVATING METAL CIRCUIT DEVICES FOR USE IN A SUBMERGED AMBIENT ENVIRONMENT

TECHNICAL FIELD

The present invention relates generally to electrical circuits, and specifically to a self-passivating metal circuit devices for use in a submerged ambient environment.

BACKGROUND

Electrical conductors propagate electrical power and/or provide input and output contacts in every electrical circuit device. Environmental conditions are typically not a concern for operation of circuit devices. However, in some ambient environments, electrical conductors may be required to be jacketed, shielded, or otherwise unexposed to the ambient environment in which the circuit device is being used. For example, wet or even submerged ambient environments can provide challenges for the use of circuit devices, as moisture or liquid between physically separated electrical conductors can result in a short-circuit. To mitigate such short-circuit conditions in a wet or submerged ambient environment, electrical contacts and conductors of electrical devices are often fabricated in waterproof housings or couplings. Such modifications to the fabrication of circuit devices for use in such wet or submerged ambient environments can be expensive and time-consuming, and can still be prone to failure based on wear or degradation of the materials that cover the electrical conductors and contacts.

SUMMARY

One example includes a circuit device for use in a submerged ambient environment. The circuit device includes at least one input electrical contact configured to receive an electrical input. The circuit device also includes at least one output contact configured to provide an electrical output. The circuit device further includes at least one electrical conductor associated with an electrical function of the circuit device. Each of the at least one input electrical contact, the at least one output contact, and the at least one electrical conductor are formed at least in part from one of a variety of self-passivating metals. The at least one input electrical contact, the at least one output contact, and the at least one electrical conductor are exposed to the submerged ambient environment.

Another example includes a method for fabricating a circuit device comprising at least one of an inductor coil, a switch, a relay, a circuit breaker, and a thermostat for use in a submerged ambient environment. The method includes forming at least one input electrical contact of the circuit device at least in part from one of a variety of self-passivating metals. The at least one input electrical contact can be configured to receive an electrical input. The method also includes forming at least one output contact of the circuit device at least in part from one of the variety of self-passivating metals. The at least one output contact can be configured to provide an electrical output. The method also includes forming at least one electrical conductor of the circuit device at least in part from one of the variety of self-passivating metals. The at least one electrical conductor can be associated with an electrical function of the circuit device.

Another example includes a method for implementing a circuit device in a submerged ambient environment. The method includes electrically coupling at least one first electrical conductor to at least one respective input electrical contact of the circuit device. The at least one input electrical contact can be coupled to at least one electrical conductor of the circuit device. The at least one electrical conductor can be exposed to a submerged ambient environment. The method also includes electrically coupling at least one second electrical conductor to at least one respective output contact of the circuit device. The at least one output contact can be coupled to the at least one electrical conductor of the circuit device. The method further includes submerging the circuit device in the submerged ambient environment before or after the electrical coupling, and at least one of mechanically and electrically controlling the circuit device to provide an electrical function via the at least one electrical conductor in response to an electrical input provided to the circuit device from the at least one first electrical conductor.

DETAILED DESCRIPTION

Figure 1:
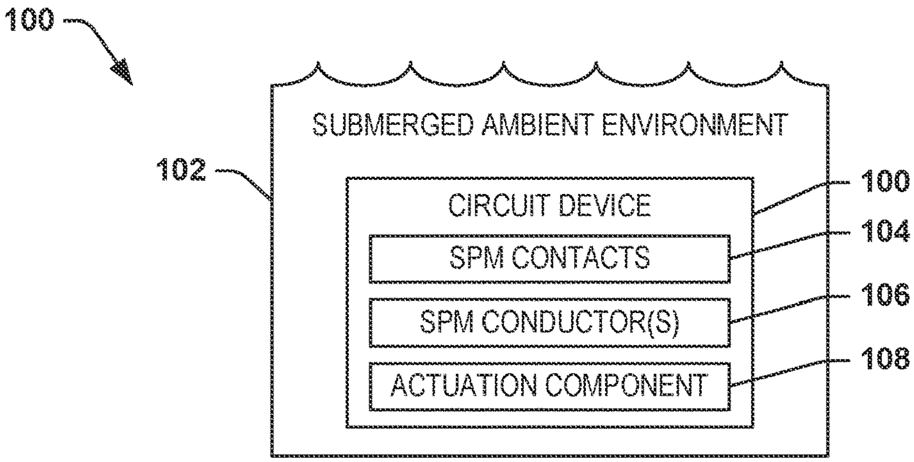
FIG. 1 illustrates an example block diagram of a circuit device.

The present invention relates generally to electrical circuits, and specifically to a self-passivating metal circuit devices for use in a submerged ambient environment. A self-passivating metal circuit device can correspond to any of a variety of circuit devices that are formed at least in part from a self-passivating metal material. When submerged in a fluid (e.g., water), self-passivating metal materials develop a dielectric film that acts as an insulator between the self-passivating metal material and the fluid. Examples of self-passivating metal materials include niobium, tantalum, titanium, zirconium, molybdenum, ruthenium, rhodium, palladium, hafnium, tungsten, rhenium, osmium, iridium, and/or alloys associated therewith.

The circuit devices can be fabricated, for example, such that some or all of the electrical contacts and electrical conductors are formed from the self-passivating metal material, and can be exposed to an exterior ambient environment of the circuit device. As described herein, the term "submerged ambient environment" can refer to an environment that is partially or completely beneath the surface of a volume of fluid (e.g., water), or can refer to a wet environment that can correspond to an otherwise hostile environment for electrical conduction, such as an ambient environment in high humidity or is prone to fluid exposure (e.g., dripping or spraying). Therefore, the circuit devices described herein can operate in a submerged ambient environment without short-circuits resulting from electrical arcing through the associated fluid.

The circuit devices can be any of a variety of simple electrical devices that can operate in the submerged ambient environment based on being fabricated at least in part of the self-passivating metal material. As a first example, a circuit device can be configured as a simple wire coil, such as to operate as an inductor. Thus, in the first example of the circuit device formed as a wire coil, the entirety of the circuit device can be formed at least in part from the self-passivating metal material. As a second example, the circuit device can be formed as a switch (e.g., a manual switch). As described herein, the term “switch” refers to any of a variety of devices that implement mechanical energy to open or close a set of electrical contacts. Thus, the switch can be configured as a push button, a hinged switch, a hydraulic switch or button, or any of a variety of circuit devices that implements mechanical energy to provide an open circuit or short circuit with respect to an electrical connection.

The circuit device can be configured such that the electrical contacts and electrical conductors are formed at least in part from the self-passivating metal material, but can also include an actuation portion. As described herein, the actuation portion of the circuit device refers to the mechanical components that provide structural and functional operation of the circuit device, and are not provided any electrical energy. The actuation portion for a given circuit device can be formed of any of a variety of durable materials that can withstand prolonged exposure to the submerged ambient environment, and do need to operate the same as the self-passivating metal material based on not being connected to electrical energy. In the second example of the circuit device formed as a switch, the actuation portion can include a housing, a spring, a guide shaft, an actuation plunger, or any of a variety of other mechanical components configured to enable operation of the switch.

In a third example, the circuit device can be configured as a relay, and can thus include the features of both the first example and the second example. For example, the relay can include a coil formed from a self-passivating metal material, and can include a switch portion that includes electrical contacts and electrical conductors that can operate as a switch in response to the presence or absence of magnetic energy provided through the coil. The circuit device configured as a relay can likewise include an actuation portion. As a fourth example, the circuit device can be configured as a circuit breaker. The circuit breaker can include a current sense coil (e.g., formed from a self-passivating metal material) and/or a sense-contactor (e.g., a thermal detector, such as a bimetallic thermal detector) that can engage one or more trip bar contacts in response to an excessive current amplitude provided on electrical contacts and conductors formed from a self-passivating metal material. As a fifth example, the circuit device can be configured as a thermostat. The thermostat can include a thermal sensing coil formed from a self-passivating metal material that can engage a cam and a switch (e.g., with the switch being formed from a self-passivating metal material), such as to engage a simple electrical heating element.

FIG. 1 illustrates an example block diagram of a circuit device 100. The circuit device 100 can correspond to a circuit device described herein, and is thus demonstrated diagrammatically as being provided in a submerged ambient environment 102. As described above, the submerged ambient environment 102 can correspond to at least partial submersion in a fluid, or can correspond to ambient exposure to fluid. For example, the circuit device 100 can be configured to operate underwater without requiring water-proof coatings or enclosures.

The circuit device 100 includes electrical contacts 104 formed from a self-passivating metal material (“SPM CONTACT(S)”) and at least one electrical conductor 106 formed from a self-passivating metal material (“SPM CONDUCTORS”). As described herein, the term “electrical contact” refers to a mechanical or integral coupling of a wire to the circuit device 100 to provide electrical input to or electrical output from the circuit device 100. Therefore, each circuit device 100 described herein includes at least one input electrical contact 104 and at least one output electrical contact 104. As also described herein, the term “electrical conductor” refers to any electrically conductive parts or wires associated with the circuit device 100 to provide the electrical function of the circuit device 100. In the example of FIG. 1, because the electrical contact(s) 104 and the electrical conductors 106 are formed from a self-passivating metal material, the circuit device 100 can be fabricated such that the electrical contact(s) 104 and the electrical conductors 106 can be exposed on an ambient exterior of the circuit device 100 without experiencing electrical arcing between any of or any portions of the electrical contact(s) 104 and the electrical conductors 106. The electrical contact(s) 104 and/or the electrical conductors 106 can be formed in entirety of a self-passivating metal material, or can be formed from a non-self-passivating metal material and can be coated with a self-passivating metal material, as described herein.

As described herein, the self-passivating metal material is configured to form a thin insulating layer when submerged in fluid (e.g., the submerged ambient environment 102). The thin insulating layer can mitigate electrical arcing through the fluid (or air in a wet or humid environment) between the electrical contact(s) 104 and the electrical conductors 106 that are physically separated. As described herein regarding the examples of circuit devices 100, separate ones of the electrical contact(s) 104 and/or the electrical conductors 106 can be described as conductively or electrically coupled to each other, which can correspond to a mechanical coupling of the separate ones of the electrical contact(s) 104 and/or the electrical conductors 106 to provide current flow therebetween. The conductive/electrical coupling can also occur based on the closing of switches formed from a self-passivating metal material, as described in greater detail below. The conductive/electrical coupling can be based on mechanical abrasion between the separate ones of the electrical contact(s) 104 and/or the electrical conductors 106 that serves to scrape away the thin insulating layer formed by the self-passivating metal material at the locations of mechanical coupling. Therefore, current can flow between separate ones of the electrical contact(s) 104 and/or the electrical conductors 106 as normal while still mitigating electrical arcing through the submerged ambient environment 102 between the physically separate portions of the electrical contact(s) 104 and/or the electrical conductors 106.

Figure 2:
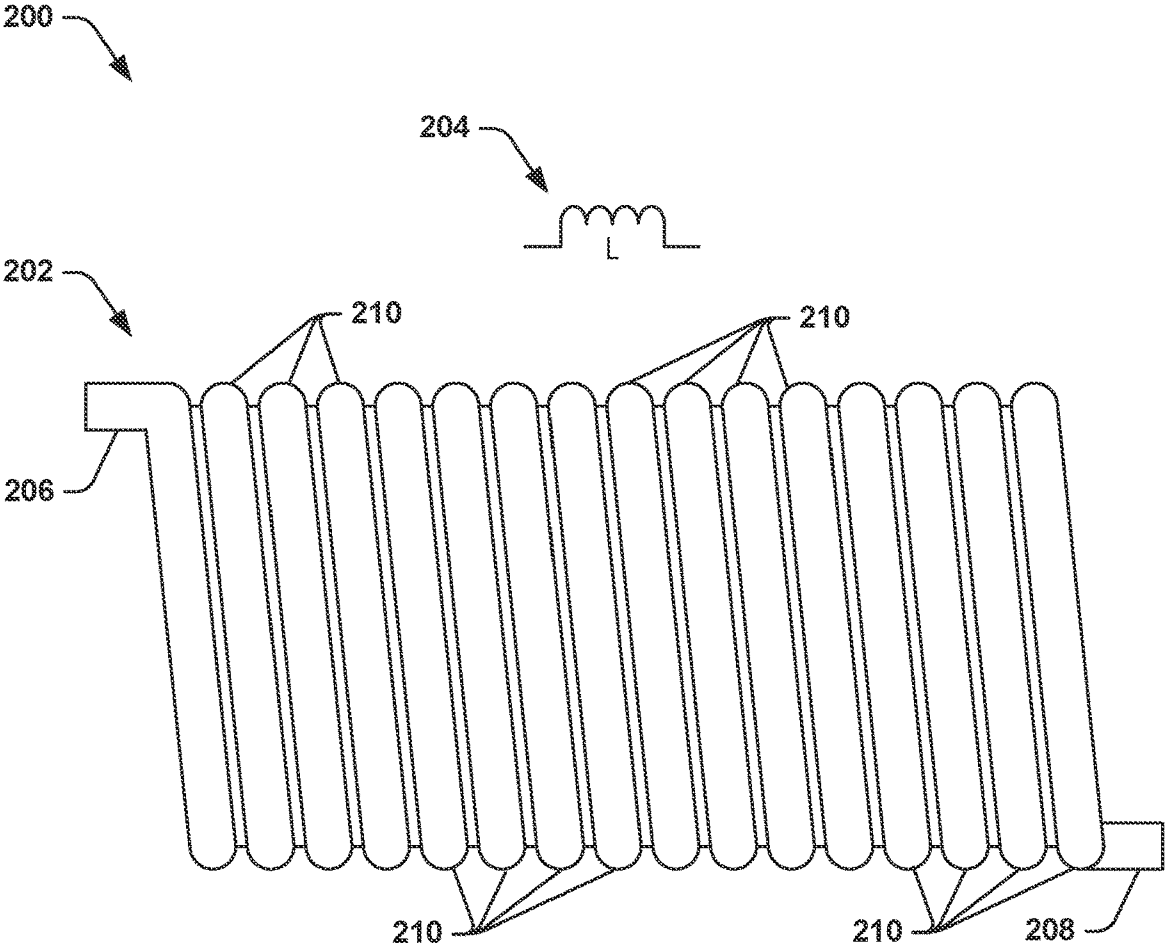
FIG. 2 illustrates an example diagram of a coil.

The circuit devices described herein are all provided as respective examples. A circuit device described herein is thus not limited to the specific examples described herein. As a first example, the circuit device 100 can be configured as a simple wire coil, such as to operate as an inductor. FIG. 2 illustrates an example diagram 200 of a coil 202. The coil 202 is demonstrated diagrammatically as a schematic circuit component inductor L at 204. Therefore, the coil 202 can thus operate as an inductor configured to generate a magnetic field in response to current, and/or to generate current in response to a magnetic field.

The coil 202 can correspond to the circuit device 100 in the example of FIG. 1. The coil 202 includes an input electrical contact 206 and an output electrical contact 208 that can form an input and output, respectively for electrical current. The coil 202 also includes a plurality of conductive loops 210 that can correspond to the electrical conductors 106 in the example of FIG. 1. The contacts 206 and 208 and the conductive loops 210 can be formed integral with respect to each other, and thus the coil 202 can simply be formed as a wire having a portion that is looped about an axis at least once. Similar to as described above in the example of FIG. 1, the contacts 206 and 208 and the conductive loops 210 can be formed at least partially from a self-passivating metal material. Therefore, the contacts 206 and 208 and the conductive loops 210 can be exposed at an exterior of the coil 202 to ambient conditions, such as the submerged ambient environment 102.

While a self-passivating metal material can form an insulating layer when submerged, self-passivating metal materials that are provided in physical contact can scrape away the insulating layer to provide electrical connectivity. Therefore, the input electrical contact 206 and the output contact 208 can be mechanically coupled (e.g., via screw contacts, clip contacts, or any of a variety of other ways of providing electrical coupling) to wires that are configured to conduct the current that is provided through the coil 202. The wires, or a portion of the wires, can likewise be formed from the self-passivating metal material. Therefore, despite the insulating layer that forms on the self-passivating metal material, the wires and the respective contacts 206 and 208 can still provide electrical connectivity based on a mechanical abrasion of the coupling of the wire to the respective contacts 206 and 208, as described above.

In a conventional electrical coil or inductor, the electrical conductor that is looped to form the coil is jacketed with an insulating material, such that respective portions of adjacent loops are not provided in electrical contact with each other. Conversely, because the coil 202 is formed from a self-passivating metal material, the coil 202 does not require jacketing to operate in the submerged ambient environment 102. However, respective portions of the adjacent conductive loops 210 of the coil 202 could still provide electrical contact with each other if the adjacent conductive loops 210 are provided in physical contact with each other. Therefore, as an example, to mitigate electrical conduction between respective portions of adjacent conductive loops 210, the coil 202 can be formed to include a physical space between the adjacent conductive loops 210, thereby mitigating physical contact of the adjacent conductive loops 210. Therefore, the self-passivating metal material can form the insulating layer between the adjacent conductive loops 210 to mitigate electrical arcing between the adjacent conductive loops 210.

As another example, the coil 202 can be formed to include an offset structure (e.g., a thin insulating layer, not shown) that physically separates the adjacent conductive loops 210. For example, the offset structure can correspond to a thin insulating layer that is formed along the length of the wire about a portion of the circumference (e.g., cross-sectional periphery) of the wire. Therefore, when the wire is wound to form the conductive loops 210, the insulating offset structure can provide insulation between the adjacent conductive loops 210. However, because the coil 202 is formed from the self-passivating metal material, the remaining portion of the circumference (e.g., cross-sectional periphery) of the wire can be exposed to the ambient environment, and thus the submerged ambient environment, without risk of electrical arcing between any of the conductive loops 210.

Referring back to the example of FIG. 1, the circuit device 100 can include an actuation portion 108. The actuation portion 108 of the circuit device 100 corresponds to the structural or mechanical components that provide structural and functional operation of the circuit device 100, and are distinguishable from the electrical contact(s) 104 and electrical conductors 106 in that the actuation portion 108 is not provided any electrical energy. The actuation portion 108 for a given circuit device 100 can be formed of any of a variety of durable materials that can withstand prolonged exposure to the submerged ambient environment 102, and is not required to be formed from the self-passivating metal material based on not being connected to electrical energy. However, the actuation portion 108 can be formed from a self-passivating metal material for longevity of operation in the submerged ambient environment 102. Examples of circuit devices 100 that include an actuation portion 108 are demonstrated in the examples of FIGS. 3-6.

Figure 3:
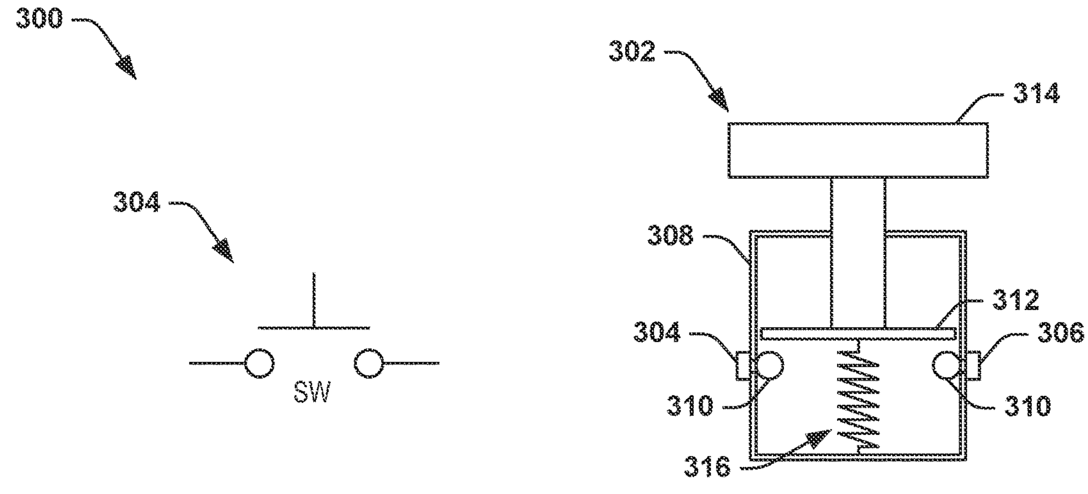
FIG. 3 illustrates an example diagram of a switch.

FIG. 3 illustrates an example diagram 300 of a switch 302. The switch 302 is demonstrated diagrammatically as a schematic circuit component switch SW at 304. As described above, the term switch refers to a broad set of circuit devices that selectively provide open-circuit and short-circuit of electrical current. In the example of FIG. 3, the switch 302 is demonstrated more specifically as a pushbutton, but can correspond to any of a variety of different types of switches.

The switch 302 includes an input electrical contact 304 and an output electrical contact 306 that are demonstrated as being provided external to a housing 308. The electrical contacts 304 and 306 can correspond to any of a variety of connection means to which electrical wires can be mechanically coupled (e.g., screw terminals, spring terminals, etc.). The electrical contacts 304 and 306 are conductively coupled and/or integral with switch contacts 310 that are demonstrated as internal to the housing 308, but the switch 302 is not limited to such an arrangement. The switch 302 also includes an electrical conductor 312 that is moved by an actuation plunger 314 to selectively provide or not provide electrical connection between the switch contacts 310, and thus to provide electrical connection between the electrical contacts 304 and 306. The actuation plunger 314 can be any of a variety of mechanical/physical switch actuation elements, and is demonstrated in the example of FIG. 3 as being spring-loaded via a spring 316. Furthermore, while the switch 302 is demonstrated in the example of FIG. 3 as being a normally-open switch, the switch 302 can be any of a variety of switches, such as having any number of poles and throws, latching or non-latching, having any number of input and output electrical contacts 304 and 306, etc.

In the example of FIG. 3, the electrical contacts 304 and 306, the switch contacts 310, and the electrical conductor 312 can be at least partially formed from a self-passivating metal material, such that the exterior of the electrical contacts 304 and 306, the switch contacts 310, and the electrical conductor 312 can be exposed to the submerged ambient environment 102. The housing 308, the actuation plunger, and the spring 316 (e.g., as well as other coupling components, guide rods, mechanical latches, etc.) can all correspond to the actuation portion 108, and can thus be formed from any of a variety of durable and water-resistant materials. As an example, the housing 308 can be open to allow fluid to flow within the housing 308, thereby covering the electrical contacts 304 and 306, the switch contacts 310, and the electrical conductor 312. Because the electrical contacts 304 and 306, the switch contacts 310, and the electrical conductor 312 are formed from the self-passivating metal material, the insulating layer of the self-passivating metal material mitigates electrical arcing with respect to the electrical contacts 304 and 306, the switch contacts 310, and the electrical conductor 312 in the submerged ambient environment 102. Accordingly, the housing 308 can be fabricated in a more simplistic and/or cost efficient manner, without being required to be waterproof and/or without risk of failure from fluid leaks to within the housing 308.

Figure 4:
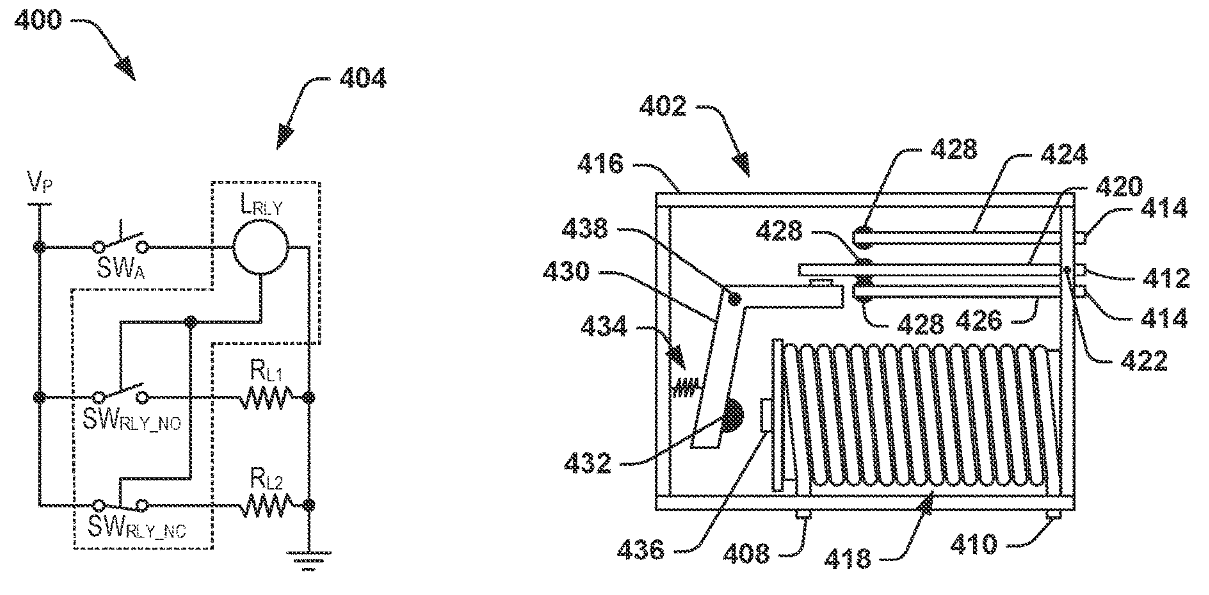
FIG. 4 illustrates an example diagram of a relay.

FIG. 4 illustrates an example diagram 400 of a relay 402. The relay 402 is demonstrated diagrammatically as part of a schematic ladder-logic circuit at 404. As described herein, the term relay refers to any of a variety of switches that are magnetically or electrically controlled to selectively provide open-circuit and short-circuit of electrical current. In the example of FIG. 4, the relay 402 is also demonstrated by example as an “ice-cube” relay at 406 in two views, demonstrated as looking along the −Z axis in the first view and looking along the −Y axis in the second view. However, the relay 402 is not limited to such a structure.

The relay 402 includes a first input electrical contact 408, a first output electrical contact 410, a second input electrical contact 412, and second output electrical contacts 414 that are demonstrated as being provided external to a housing 416. The electrical contacts 408, 410, 412, and 414 can correspond to any of a variety of connection means to which electrical wires can be mechanically coupled (e.g., screw terminals, spring terminals, etc.). The electrical contacts 408 and 410 are provided on and integral with opposite ends of a coil 418. The second input electrical contact 412 is coupled to a moving switch portion 420 that can pivot about a connection with the housing 416, with the pivot being demonstrated at 422. The second output electrical contacts 414 are coupled to a normally-open switch portion 424 and a normally-closed switch portion 426, respectively, that are static with respect to the housing 416. The switch portions 420, 424, and 426 each include contact electrodes 428 that can provide electrical connection between the switch portions 420, 424, and 426, and thus selectively between the electrical contact 412 and one of the second output electrical contacts 414.

The relay 402 includes an armature 430 that includes a ferromagnetic contact 432 and a spring 434 that is coupled to the housing 416. The spring 434 is configured to maintain a nominal position of the armature 430 corresponding to no current being provided through the coil 418 via the contacts 408 and 410. Thus, in the nominal position, the contact electrodes 428 of the armature 430 and the normally-closed switch portion 426 are closed while the contact electrodes 428 of the armature 430 and the normally-open switch portion 424 are open.

In response to the coil 418 being energized in response to electrical current provided via the electrical contacts 408 and 410, a core 436 of the coil 418 provides a magnetic force on the ferromagnetic contact 432 that is greater than the mechanical force provided by the spring 434. The armature 430 thus rotates about a pivot 438 (e.g., coupled to the housing 416) to engage with the moving switch portion 420. In response to the engagement of the armature 430 with the moving switch portion 420, the moving switch portion 420 can open the electrical contact of the contact electrodes 428 between the moving switch portion 420 and the normally-closed switch portion 426 and can close the electrical contact of the contact electrodes 428 between the moving switch portion 420 and the normally-open switch portion 424.

In the example of FIG. 4, the circuit 404 is demonstrated as a ladder-logic circuit that includes input and output circuit components arranged between a power voltage $V_P$ and a low-voltage rail (e.g., ground). The relay 402 is demonstrated in the circuit 404 as a relay circuit 440 that is enclosed by a dotted line. In the example of FIG. 4, the relay circuit 440 includes a relay coil $L_{RLY}$, a normally-open switch $SW_{RLY\_NO}$, and a normally-closed switch $SW_{RLY\_NC}$. The relay coil $L_{RLY}$ can correspond to the coil 418 of the relay 402, the normally-open switch $SW_{RLY\_NO}$ can correspond to the normally-open switch portion 424, and the normally-closed switch $SW_{RLY\_NC}$ can correspond to the normally-closed switch portion 426.

With further reference to the circuit 404, the relay coil $L_{RLY}$ provides a magnetic field for switching the relay 402, and thus for changing the state of the switches $SW_{RLY\_NO}$ and $SW_{RLY\_NC}$. In the circuit 404, the relay coil $L_{RLY}$ is demonstrated as being connected between an external switch $SW_A$ and the low-voltage rail. The switches $SW_{RLY\_NO}$ and $SW_{RLY\_NC}$ are each interconnected between the power voltage $V_P$ and respective first and second external loads RU and $R_{L2}$. In the nominal state (e.g., the power voltage $V_P$ not being connected to the relay coil $L_{RLY}$), the normally-closed switch $SW_{RLY\_NC}$ is closed to provide current from the power voltage $V_P$ to the second external load $R_{L2}$, and the normally-open switch $SW_{RLY\_NO}$ is open to prevent current from the power voltage $V_P$ to the first external load $R_{L1}$. In response to the external switch $SW_A$ being activated to provide the power voltage $V_P$ to the relay coil $L_{RLY}$, the relay coil $L_{RLY}$ is energized to change the state of the switches $SW_{RLY\_NO}$ and $SW_{RLY\_NC}$. Therefore, the normally-closed switch $SW_{RLY\_NC}$ opens to disconnect the power voltage $V_P$ from the second external load $R_{L2}$, and the normally-open switch $SW_{RLY\_NO}$ is closed to provide current from the power voltage $V_P$ to the first external load $R_{L1}$.

In the example of FIG. 4, the electrical contacts 408, 410, 412, and 414 can correspond to the electrical contact(s) 104, and the coil 418, the switch portions 420, 424, and 426, and the contact electrodes 428 can correspond to the electrical conductors 106. Therefore, the electrical contacts 408, 410, 412, and 414, the coil 418, the switch portions 420, 424, and 426, and the contact electrodes 428 can be at least partially formed from a self-passivating metal material. Therefore, the exterior of the electrical contacts 408, 410, 412, and 414, the coil 418, the switch portions 420, 424, and 426, and the contact electrodes 428 can be exposed to the submerged ambient environment 102. The housing 416, the armature 430, the ferromagnetic contact 432, the spring 434, and the core 436 can be formed from any of a variety of durable and water-resistant materials.

As an example, the housing 416 can be open to allow fluid to flow within the housing 416, thereby covering the electrical contacts 408, 410, 412, and 414, the coil 418, the switch portions 420, 424, and 426, and the contact electrodes 428. Because the electrical contacts 408, 410, 412, and 414, the coil 418, the switch portions 420, 424, and 426, and the contact electrodes 428 are formed from the self-passivating metal material, the insulating layer of the self-passivating metal material mitigates electrical arcing with respect to the electrical contacts 408, 410, 412, and 414, the coil 418, the switch portions 420, 424, and 426, and the contact electrodes 428 in the submerged ambient environment 102. Accordingly, the housing 416 can be fabricated in a more simplistic and/or cost efficient manner, without being required to be waterproof and/or without risk of failure from fluid leaks to within the housing 416.

In the example of FIG. 4, the “ice-cube” relay 406 is demonstrated as having an open arrangement with respect to the electrical and mechanical circuit components (e.g., the demonstrated relay 402), and thus does not include the clear enclosure that typically surrounds the electrical and mechanical circuit components that typically provides the characteristic “ice-cube” appearance. Alternatively, the “ice-cube” relay 406 can include an enclosure to provide protection against forces or collisions, but such an enclosure does not need to be sealed and/or can be porous to liquid. Therefore, the electrical and mechanical circuit components of the "ice-cube" relay 406 can be exposed to the submerged ambient environment 102.

In addition, in the example of FIG. 4, the "ice-cube" relay 406 includes a base 442 on which the electrical and mechanical circuit components are mounted. The base 442 includes a first set of contacts 444 and a second set of contacts 446 to which external wires can be mechanically coupled. In the example of FIG. 4, the first set of contacts 444 includes three screw contacts that can correspond to the first input electrical contact 408, the first output electrical contact 410, and the second input electrical contact 412, respectively. The second set of contacts 446 includes two screw contacts that can correspond to the respective output electrical contacts 414 (e.g., conductively coupled to the normally-open switch portion 424 and the normally-closed switch portion 426). The first and second sets of contacts 444 and 446 can also be formed from a self-passivating metal material, thereby allowing the entirety of the electrical and mechanical circuit components of the ice-cube relay 406 to be exposed to and operate in the submerged ambient environment 102.

Figure 5:
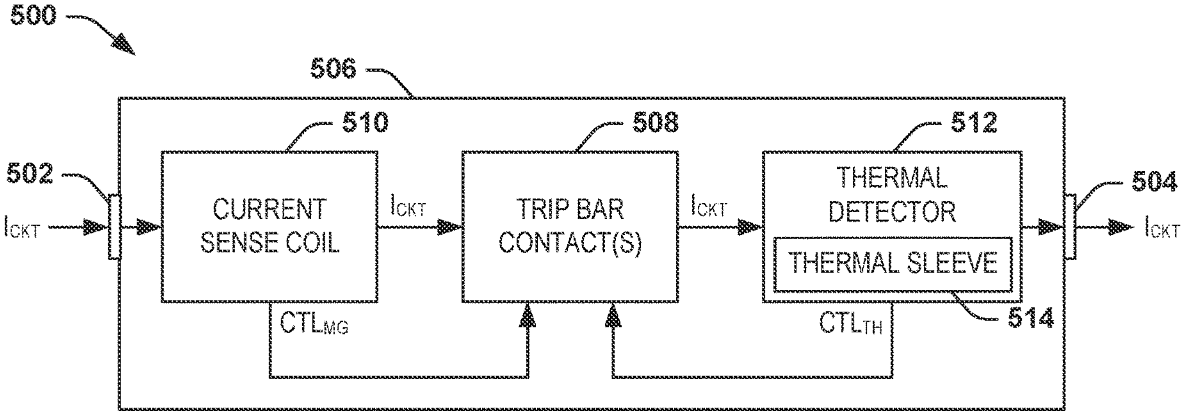
FIG. 5 illustrates an example diagram of a circuit breaker.

FIG. 5 illustrates an example diagram of a circuit breaker 500. The circuit breaker 500 can be implemented in any of a variety of electric circuits to monitor an amplitude of a current $I_{CKT}$ and to provide an open-circuit in response to an amplitude of the current $I_{CKT}$ increasing beyond a threshold amplitude. As an example, the threshold amplitude can be a predefined amplitude that is associated with safety and/or integrity of the associated electric circuit.

The circuit breaker 500 is demonstrated in a current path of the current $I_{CKT}$. In the example of FIG. 5, the circuit breaker 500 includes an input electrical contact 502 that receives the current $I_{CKT}$ as an input and an output electrical contact 504 that provides the current $I_{CKT}$ as an output. The electrical contacts 502 and 504 are arranged at an exterior of a housing 506, such that the electrical contacts 502 and 504 can be electrically coupled to external wires configured to propagate the current $I_{CKT}$. The circuit breaker 500 includes one or more trip bar contacts 508 that are configured to rapidly open to provide an open-circuit of the current $I_{CKT}$, thereby ceasing the flow of the current $I_{CKT}$ through the circuit breaker 500. In the example of FIG. 5, the circuit breaker 500 is demonstrated as including both a current sense coil 510 and a thermal detector 512 that are each arranged in the current path of the current $I_{CKT}$. However, as described herein, the circuit breaker 500 could include only one of the current sense coil 510 and the thermal detector 512. Further, the series arrangement of the trip bar contact(s) 508, the current sense coil 510, and the thermal detector 512 can be provided in any of a variety of different ways.

The current sense coil 510 can be arranged as a coil (e.g., similar to the coil 202) that is configured to generate a magnetic field in response to the current $I_{CKT}$. Therefore, the current sense coil 510 can be indicative of the amplitude of the current $I_{CKT}$ based on the amplitude of the magnetic field. In the example of FIG. 5, the current sense coil 510 is demonstrated as generating a first control signal $CTL_{MG}$ to the trip bar contact(s) 508. The first control signal $CTL_{MG}$ can thus be configured to engage the trip bar contact(s) 508 to provide a rapid open-circuit of the current path of the current $I_{CKT}$. For example, the first control signal $CTL_{MG}$ can merely correspond to the magnetic field generated by the current sense coil 510 that engages an actuator portion of the trip bar contact(s) 508, or can correspond to an electrical or mechanical actuation that is provide to the trip bar contact(s) 508. Accordingly, the current sense coil 510 is configured to provide the first control signal $CTL_{MG}$ to rapidly engage the trip bar contact(s) 508 to cease the current flow of the current $I_{CKT}$ in response to the current $I_{CKT}$ exceeding a predefined amplitude.

The thermal detector 512 can be arranged as an electrical conductor that is configured to propagate the current $I_{CKT}$. The thermal detector 512 can thus detect an amplitude of the current $I_{CKT}$ based on a temperature of the electrical conductor that constitutes the thermal detector 512. As one example, the thermal detector 512 can be configured as a bimetallic electrical conductor having two dissimilar conductive metals that exhibit different rates of thermal expansion. Therefore, because the amplitude of the current $I_{CKT}$ through the thermal detector 512 can be proportional to the temperature of the thermal detector 512, the dissimilar metals can expand at different rates in response to an amplitude of the current $I_{CKT}$ that is greater than a predefined threshold. The dissimilar expansion rates can result in the electrical conductor of the thermal detector 512 bending, with the bending resulting in a second control signal $CTL_{TH}$ being provided to the trip bar contact(s) 508 to provide the open-circuit of the current path of the current $I_{CKT}$. As an example, the bending of the electrical conductor can result in actuation of components of an actuation portion in the thermal detector 512 and/or the trip bar contact(s) 508, thus corresponding to the second control signal $CTL_{TH}$, to engage the trip bar contact(s) 508. While the description of the example herein describes thermal detection based on a bimetallic conductor, the thermal detector 512 can be configured in other ways to detect the amplitude of the current $I_{CKT}$. Accordingly, the thermal detector 512 is configured to provide the second control signal $CTL_{MG}$ to rapidly engage the trip bar contact(s) 508 to cease the current flow of the current $I_{CKT}$ in response to the current $I_{CKT}$ exceeding a predefined amplitude.

In the example of FIG. 5, the electrical contacts 502 and 504 can correspond to the electrical contact(s) 104, and the electrical conductor of the current sense coil 510, the trip bar contact(s) 508, and the thermal detector 512 through which the current $I_{CKT}$ flows can correspond to the electrical conductor 106. Therefore, the electrical contacts 502 and 504 and the electrical conductors of the current sense coil 510, the trip bar contact(s) 508, and the thermal detector 512 can be at least partially formed from a self-passivating metal material. Accordingly, the exterior of the electrical contacts 502 and 504 and the electrical conductors of the current sense coil 510, the trip bar contact(s) 508, and the thermal detector 512 can be exposed to the submerged ambient environment 102. In the example of FIG. 5, the thermal detector 512 can include a thermal sleeve 514 that can be formed over the electrical conductor of the thermal detector 512 to prevent excessive heat loss from the electrical conductor to the submerged ambient environment 102, thereby ensuring proper operation in sensing the temperature of the electrical conductor.

As described above, the current sense coil 510, the trip bar contact(s) 508, and/or the thermal detector 512, as well as a housing (not shown) can include an actuation portion 108 which can be formed from any of a variety of durable and water-resistant materials. An example of the actuation portion 108 of the trip bar contact(s) 508 can include latching springs to provide for rapid and latched open-circuit actuation of the trip bar contact(s) 508. As an example, the circuit breaker 500 (e.g., a housing associated with the circuit breaker 500) can be open to allow fluid to flow within the housing 416, thereby covering the electrical contacts 502 and 504 and the electrical conductors of the current sense coil 510, the trip bar contact(s) 508, and the thermal detector 512. Because the electrical contacts 502 and 504 and the electrical conductors of the current sense coil 510, the trip bar contact(s) 508, and the thermal detector 512 are formed from the self-passivating metal material, the insulating layer of the self-passivating metal material mitigates electrical arcing with respect to the electrical contacts 502 and 504 and the electrical conductors of the current sense coil 510, the trip bar contact(s) 508, and the thermal detector 512 in the submerged ambient environment 102. Accordingly, the circuit breaker 500 can be fabricated in a more simplistic and/or cost efficient manner, without being required to be waterproof and/or without risk of failure from fluid leaks to within an associated housing.

Figure 6:
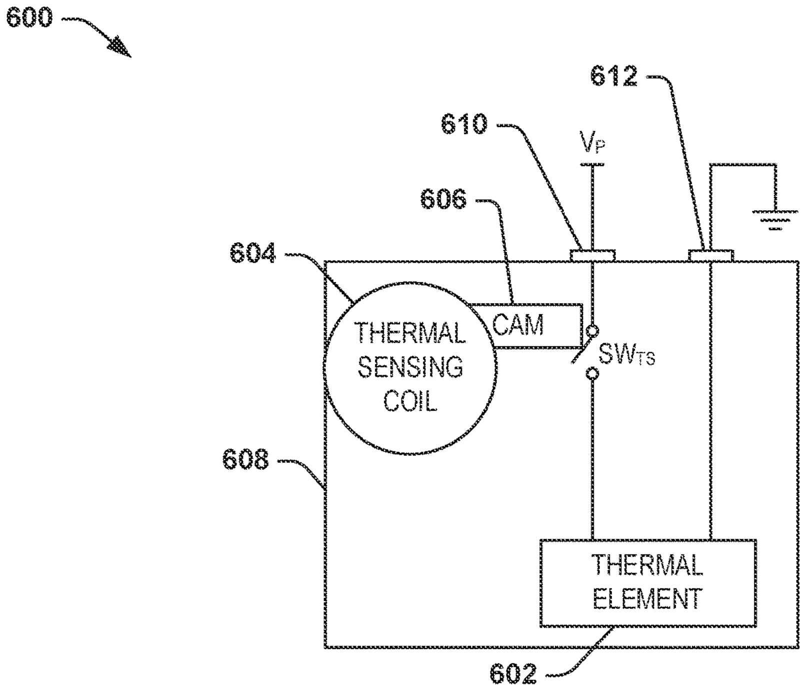
FIG. 6 illustrates an example diagram of a thermostat.

FIG. 6 illustrates an example diagram of a thermostat 600. The thermostat 600 can be implemented in any of a variety of electric circuits to control a temperature of an environment (e.g., the submerged ambient environment 102) or a device, such as to maintain an approximately consistent temperature by activating a thermal element 602 in response to the temperature achieving a threshold. As an example, the threshold temperature can be a predefined amplitude or an adjustable amplitude for proper or comfortable operation of the environment and/or associated device. For example, some devices (e.g., a battery) can exhibit degraded performance in response to temperatures that are too low.

The thermostat 600 includes a thermal sensing coil 604, a cam 606, and a switch $SW_{TS}$. The thermal sensing coil 604 can be submerged in the submerged ambient environment 102 and can be mechanically configured to extend and retract based on the ambient temperature of the submerged ambient environment 102. The thermal sensing coil 604 can be fixed to a housing 608 and mechanically coupled to the cam 606, such that the extension and retraction of the thermal sensing coil 604 can move the cam 606. The cam 606 is mechanically connected to an actuator of the switch $SW_{TS}$, such that the motion of the cam 606 resulting from the extension and retraction of the thermal sensing coil 604 can open and close the switch $SW_{TS}$. In the example of FIG. 6, a power voltage $V_P$ is provided to the thermostat 600 via a set of electrical contacts 610 and 612 on the housing 608. In the example of FIG. 6, the electrical contact 610 is coupled to the voltage source that provides the power voltage $V_P$, and is thus an input electrical contact, and the electrical contact 612 is coupled to a low-voltage rail (e.g., ground), and is thus an output electrical contact. Therefore, in response to the switch $SW_{TS}$ being closed, the thermal element 602 is provided current from the power voltage $V_P$ via the electrical contacts 610 and 612, such that the current through the thermal element 602 can exhibit temperature control of the environment or device.

In the example of FIG. 6, the electrical contacts 610 and 612 can correspond to the electrical contact(s) 104, and the switch $SW_{TS}$ (e.g., as well as the wires that provide the power voltage $V_P$) can correspond to the electrical conductors 106. Therefore, the electrical contacts 610 and 612 and the switch $SW_{TS}$ can be at least partially formed from a self-passivating metal material. Therefore, the exterior of the electrical contacts 610 and 612 and the switch $SW_{TS}$ can be exposed to the submerged ambient environment 102. The housing 608, the thermal sensing coil 604, and the cam 606 can be formed from any of a variety of durable and water-resistant materials. As an example, the housing 608 can be open to allow fluid to flow within the housing 608, thereby covering the electrical contacts 610 and 612 and the switch $SW_{TS}$. Because the electrical contacts 610 and 612 and the switch $SW_{TS}$ are formed from the self-passivating metal material, the insulating layer of the self-passivating metal material mitigates electrical arcing with respect to the electrical contacts 610 and 612 and the switch $SW_{TS}$ in the submerged ambient environment 102. Accordingly, the housing 608 can be fabricated in a more simplistic and/or cost efficient manner, without being required to be waterproof and/or without risk of failure from fluid leaks to within the housing 608.

Figure 7:
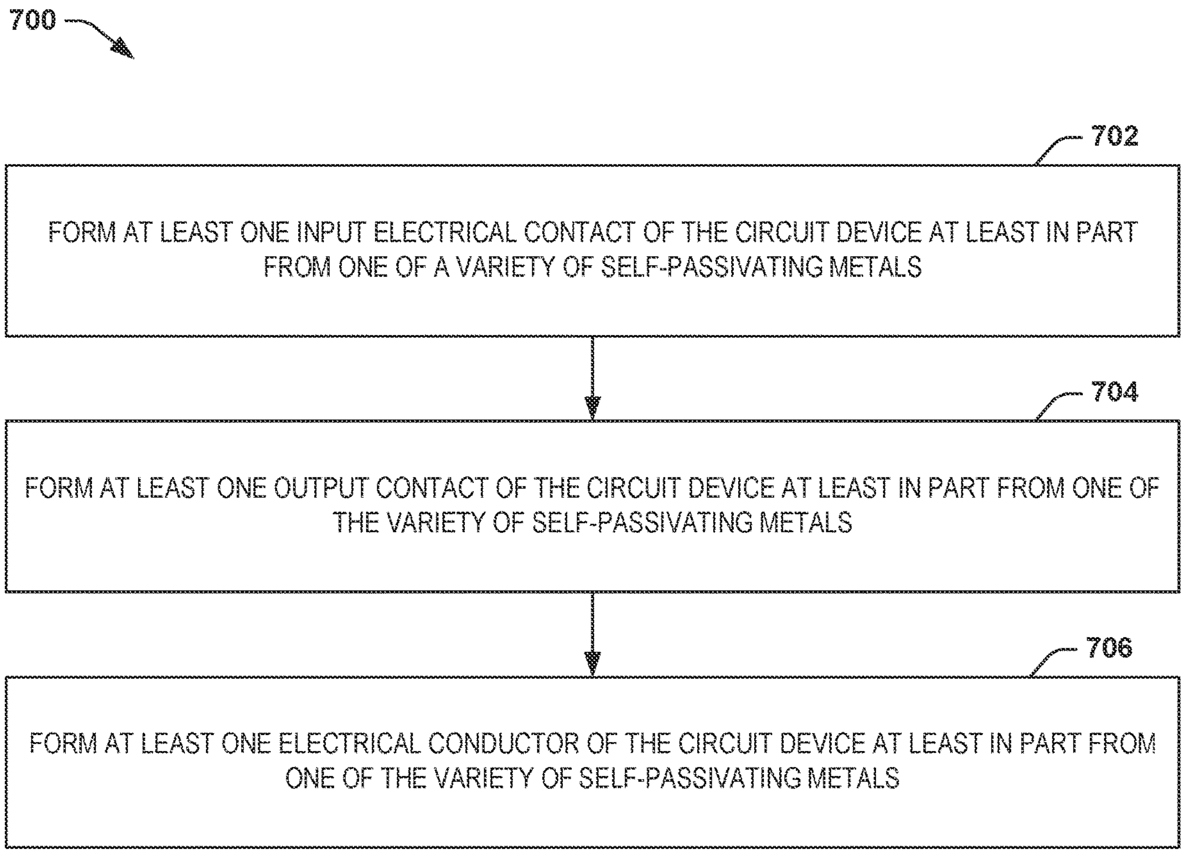
FIG. 7 illustrates an example of a method for fabricating a circuit device.
Figure 8:
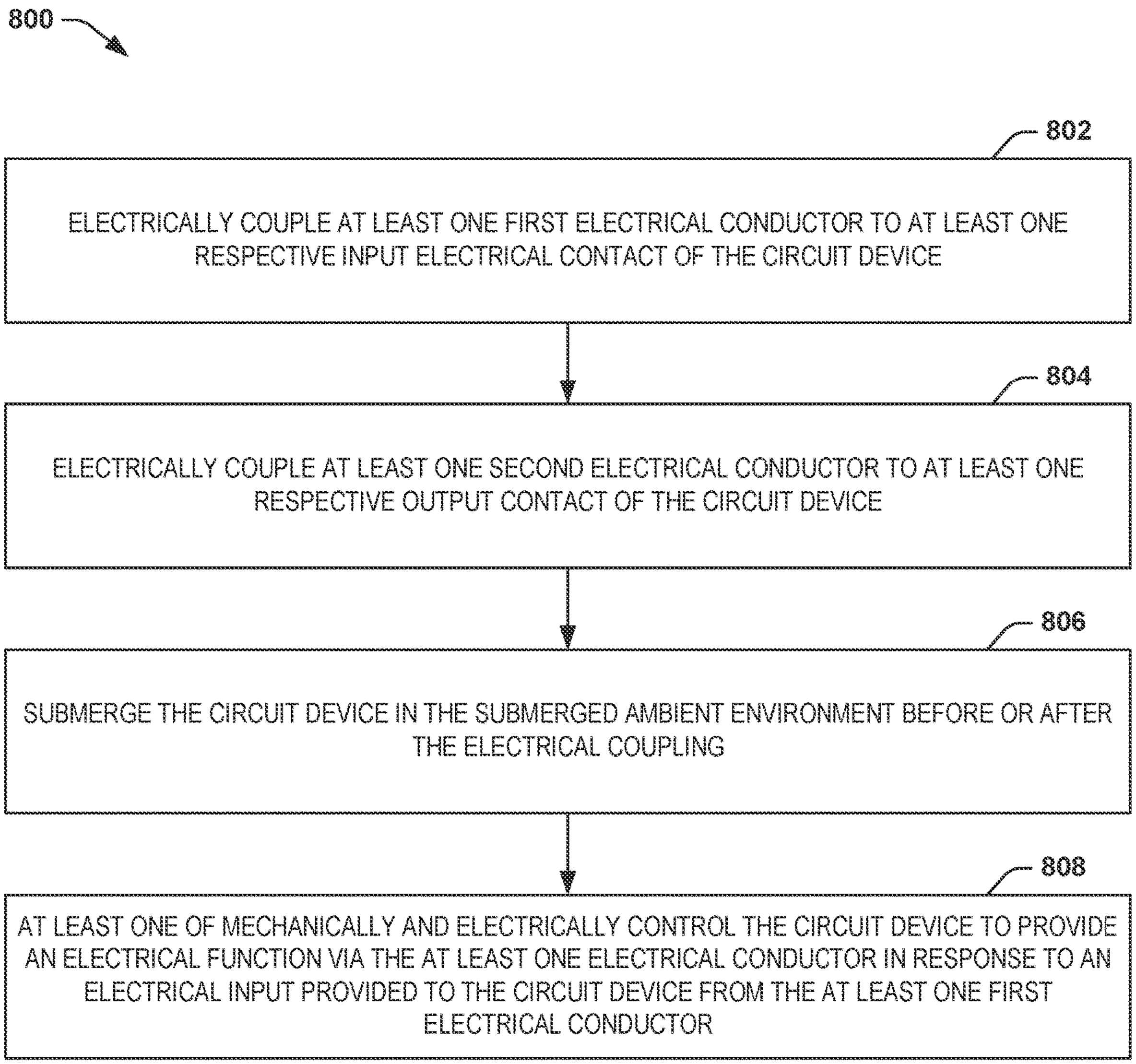
FIG. 8 illustrates an example of a method for implementing a circuit device in a submerged ambient environment.

In view of the foregoing structural and functional features described above, a methodology in accordance with various aspects of the disclosure will be better appreciated with reference to FIGS. 7 and 8. It is to be understood and appreciated that the method of FIGS. 7 and 8 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 7 illustrates an example of a method 700 for fabricating a circuit device (e.g., the circuit device 100). The circuit device (e.g., the circuit device 100) can include at least one of an inductor coil (e.g., the coil 202), a switch (e.g., the switch 302), a relay (e.g., the relay 402), a circuit breaker (e.g., the circuit breaker 500), and a thermostat (e.g., the thermostat 600) for use in a submerged ambient environment (e.g., submerged ambient environment). At 702, at least one input electrical contact (e.g., the input electrical contacts 206, 304, 408, 412, 502, 610) of the circuit device is formed at least in part from one of a variety of self-passivating metals, the at least one input electrical contact being configured to receive an electrical input. At 704, at least one output contact (e.g., the output electrical contacts 208, 306, 410, 414, 504, 612) of the circuit device is formed at least in part from one of the variety of self-passivating metals, the at least one output contact being configured to provide an electrical output. At 706, at least one electrical conductor (e.g., the electrical conductor(s) 106) of the circuit device is formed at least in part from one of the variety of self-passivating metals, the at least one electrical conductor being associated with an electrical function of the circuit device.

FIG. 8 illustrates an example of a method 800 for implementing a circuit device (e.g., the circuit device 100) in a submerged ambient environment (e.g., the submerged ambient environment 102). At 802, at least one first electrical conductor is electrically coupled to at least one respective input electrical contact (e.g., the input electrical contacts 206, 304, 408, 412, 502, 610) of the circuit device. The at least one input electrical contact can be coupled to at least one electrical conductor (e.g., the electrical conductor(s) 106) of the circuit device. The at least one electrical conductor can be exposed to the submerged ambient environment. At 804, electrically coupling at least one second electrical conductor to at least one respective output contact (e.g., the output electrical contacts 208, 306, 410, 414, 504, 612) of the circuit device. The at least one output contact can be coupled to the at least one electrical conductor of the circuit device. At 806, the circuit device is submerged in the submerged ambient environment before or after the electrical coupling. At 808, at least one of mechanically and electrically controlling the circuit device to provide an electrical function via the at least one electrical conductor in response to an electrical input provided to the circuit device from the at least one first electrical conductor.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A circuit device for use in a submerged ambient environment, the circuit device comprising:

at least one input electrical contact configured to receive an electrical input;

at least one output contact configured to provide an electrical output; and at least one electrical conductor associated with an electrical function of the circuit device, wherein each of the at least one input electrical contact, the at least one output contact, and the at least one electrical conductor are formed at least in part from one of a variety of self-passivating metals, wherein the one of the variety of self-passivating metals of the at least one input electrical contact, the at least one output contact, and the at least one electrical conductor form an insulating layer on a surface thereof when exposed to the submerged ambient environment to mitigate electrical arcing between the at least one input electrical contact, the at least one output contact, and the at least one electrical conductor.

2. The circuit device of claim 1, further comprising an actuation portion formed from one of a corrosion-resistant material and one of the variety of self-passivating metals, the actuation portion being configured to be mechanically engaged to perform the electrical function of the circuit device.

3. The circuit device of claim 1, wherein the circuit device is arranged as an inductor coil comprising the at least one electrical conductor being configured as an electrical wire wound in a plurality of loops, wherein the inductor coil comprises one of a spatial gap or an insulating material between each of the loops.

4. The circuit device of claim 1, wherein the circuit device is arranged as a switch, wherein the at least one electrical conductor is configured as at least one switch contact configured to electrically couple each of the at least one input electrical contact to a respective one of the at least one output contact.

5. The circuit device of claim 1, wherein the circuit device is arranged as a relay, wherein the at least one electrical conductor comprises an inductor coil and a plurality of switch contacts, wherein the at least one input electrical contact comprises an actuation input configured to provide current to the actuation input and through the inductor coil to engage the plurality of switch contacts to electrically couple each of the at least one input electrical contact to a respective one of the at least one output contact.

6. The circuit device of claim 1, wherein the circuit device is arranged as a circuit breaker, wherein the at least one electrical conductor comprises trip bar contacts and an actuation component.

7. The circuit device of claim 6, wherein the actuation component comprises an inductor coil configured to magnetically engage the trip bar contacts in response to an overcurrent associated with at least one electrical input provided on the respective at least one electrical input electrical contact.

8. The circuit device of claim 6, wherein the actuation component comprises a thermal detector configured to thermally engage the trip bar contacts in response to an overcurrent associated with at least one electrical input provided on the respective at least one electrical input electrical contact.

9. The circuit device of claim 8, further comprising a thermal sleeve covering the thermal detector to mitigate heat dissipation into the submerged ambient environment.

10. The circuit device of claim 1, wherein the circuit device is arranged as a thermostat, wherein the at least one input electrical contact and the at least one output contact comprises power contacts for the thermostat, wherein the at least one electrical conductor comprises a thermal sensing coil, a cam mechanically coupled to the thermal sensing coil, and a switch coupled to the cam.

11. A method for fabricating a circuit device comprising at least one of an inductor coil, a switch, a relay, a circuit breaker, and a thermostat for use in a submerged ambient environment, the method comprising:

forming at least one input electrical contact of the circuit device at least in part from one of a variety of self-passivating metals, the at least one input electrical contact being configured to receive an electrical input;

forming at least one output contact of the circuit device at least in part from one of the variety of self-passivating metals, the at least one output contact being configured to provide an electrical output; and forming at least one electrical conductor of the circuit device at least in part from one of the variety of self-passivating metals, the at least one electrical conductor being associated with an electrical function of the circuit device, wherein the one of the variety of self-passivating metals of the at least one input electrical contact, the at least one output contact, and the at least one electrical conductor form an insulating layer on a surface thereof when exposed to the submerged ambient environment to mitigate electrical arcing between the at least one input electrical contact, the at least one output contact, and the at least one electrical conductor.

12. The method of claim 11, wherein at least one of forming the at least one input electrical contact, the at least one output contact, and the at least one electrical conductor comprises forming at least one of the at least one input electrical contact, the at least one output contact, and the at least one electrical conductor entirely from the one of the self-passivating metals.

13. The method of claim 11, wherein at least one of forming the at least one input electrical contact, the at least one output contact, and the at least one electrical conductor comprises:

forming at least one of the at least one input electrical contact, the at least one output contact, and the at least one electrical conductor from a metal; and plating the metal with the one of the self-passivating metals.

14. The method of claim 11, further comprising fabricating an actuation component that is configured to be mechanically engaged to perform the electrical function of the circuit device, the actuation component being formed from one of a corrosion-resistant metal or from one of the variety of self-passivating metals.

15. A method for implementing a circuit device in a submerged ambient environment, the method comprising:

electrically coupling at least one first electrical conductor to at least one respective input electrical contact formed at least in part from one of a variety of self-passivating metals of the circuit device, the at least one input electrical contact being coupled to at least one electrical conductor of the circuit device formed at least in part from one of the variety of self-passivating metals;

electrically coupling at least one second electrical conductor to at least one respective output contact formed at least in part from one of the variety of self passivating metals of the circuit device, the at least one output contact being coupled to the at least one electrical conductor of the circuit device;

submerging the circuit device in the submerged ambient environment before or after the electrical coupling; and at least one of mechanically and electrically controlling the circuit device to provide an electrical function via the at least one electrical conductor in response to an electrical input provided to the circuit device from the at least one first electrical conductor, wherein the one of the variety of the self-passivating metals of the at least one input electrical contact, the at least one output contact, and the at least one electrical conductor form an insulating layer on a surface thereof when exposed to the submerged ambient environment to mitigate electrical arcing between the at least one input electrical contact, the at least one output contact, and the at least one electrical conductor.

16. The method of claim 15, wherein the circuit device is arranged as an inductor coil comprising the at least one electrical conductor being configured as an electrical wire wound in a plurality of loops, wherein the inductor coil comprises one of a spatial gap or an insulating material between each of the loops, wherein controlling the circuit device comprises providing an electrical current as the electrical input to the at least one input electrical contact to generate a magnetic field in the inductor coil.

17. The method of claim 15, wherein the circuit device is arranged as a switch, wherein the at least one electrical conductor is configured as at least one switch contact configured to electrically couple each of the at least one input electrical contact to a respective one of the at least one output contact, wherein controlling the circuit device comprises actuating an actuator portion of the switch to electrically couple the at least one input electrical contact to the at least one output contact.

18. The method of claim 15, wherein the circuit device is arranged as a relay, wherein the at least one electrical conductor comprises an inductor coil and a plurality of switch contacts, wherein the at least one input electrical contact comprises an actuation input, wherein controlling the circuit device comprises providing an electrical current as the electrical input to the actuation input and through the inductor coil to engage the plurality of switch contacts to electrically couple each of the at least one input electrical contact to a respective one of the at least one output contact.

19. The method of claim 15, wherein the circuit device is arranged as a circuit breaker, wherein the at least one electrical conductor comprises trip bar contacts and an actuation component, wherein controlling the controlling the circuit device comprises providing an electrical current as the electrical input to one of the at least one input electrical contacts; and at least one of:

magnetically engaging the trip bar contacts in response to an overcurrent associated with the electrical current; or thermally engaging the trip bar contacts in response to the overcurrent associated with the electrical current.

20. The method of claim 15, wherein the circuit device is arranged as a thermostat, wherein the at least one input electrical contact and the at least one output contact comprises power contacts for the thermostat, wherein the at least one electrical conductor comprises a thermal sensing coil, a cam mechanically coupled to the thermal sensing coil, and a switch coupled to the cam.

21. The circuit device of claim 1, wherein the insulating layer is formed on the one of the variety of self-passivating metals of the at least one input electrical contact, the at least one output contact, and the at least one electrical conductor in the absence of heat applied to the at least one input electrical contact, the at least one output contact, and the at least one electrical conductor.

* * * * *